(12) United States Patent
Horst et al.

(10) Patent No.: US 11,568,076 B2
(45) Date of Patent: Jan. 31, 2023

(54) COMPUTER-IMPLEMENTED METHOD OF TRANSFERRING A DATA STRING FROM AN APPLICATION TO A DATA PROTECTION DEVICE

(71) Applicant: COMFORTE AG, Wiesbaden (DE)

(72) Inventors: Henning Horst, Tussenhausen/Zaisertshofen (DE); Michael Horst, Wuthenow (DE)

(73) Assignee: COMFORTE AG, Wiesbaden (DE)

( * ) Notice: Subject to any disclaimer, the term of this patent is extended or adjusted under 35 U.S.C. 154(b) by 673 days.

(21) Appl. No.: 16/422,847

(22) Filed: May 24, 2019

(65) Prior Publication Data
US 2019/0362093 A1 Nov. 28, 2019

(51) Int. Cl.
| | |
|---|---|
| *G06F 21/62* | (2013.01) |
| *G06F 16/2455* | (2019.01) |
| *H04L 9/06* | (2006.01) |
| *H04L 9/40* | (2022.01) |

(52) U.S. Cl.
CPC ...... *G06F 21/6227* (2013.01); *G06F 16/2455* (2019.01); *G06F 21/6254* (2013.01); *H04L 9/0643* (2013.01); *H04L 63/0281* (2013.01)

(58) Field of Classification Search
None
See application file for complete search history.

(56) References Cited

U.S. PATENT DOCUMENTS

| | | | |
|---|---|---|---|
| 5,230,049 A | 7/1993 | Chang et al. | |
| 6,704,747 B1 | 3/2004 | Fong | |
| 8,291,468 B1 | 10/2012 | Chickering | |
| 10,200,407 B1* | 2/2019 | Dawkins | H04L 51/18 |
| 2004/0103405 A1 | 5/2004 | Vargas | |
| 2010/0070754 A1* | 3/2010 | Leach | H04L 63/0428 713/152 |
| 2010/0094838 A1 | 4/2010 | Kozak | |
| 2012/0278621 A1 | 11/2012 | Woloszyn | |
| 2017/0295236 A1 | 10/2017 | Kulkarni et al. | |
| 2018/0189502 A1* | 7/2018 | Kumar | H04L 9/0863 |
| 2018/0234389 A1 | 8/2018 | Jain et al. | |
| 2018/0357426 A1* | 12/2018 | Pearson | G06F 21/6254 |

FOREIGN PATENT DOCUMENTS

| | | |
|---|---|---|
| EP | 2735991 A1 | 11/2013 |
| WO | 01086427 A2 | 11/2001 |

OTHER PUBLICATIONS

German Search Report, DE102018112742.1, dated Feb. 13, 2019, (11 pages).
European Search Report, EP19175542, dated Oct. 4, 2019 (9 pages).
Springer-Verlag Berlin Heidelberg 2010, "JReq: Database Queries in Imperative Languages," Iu et al. (20 pages).
Future Generation Computer Systems 65 (2016), "Data adapter for querying and transformation between SQL and NoSQL database," Liao et al. (11 pages).

* cited by examiner

*Primary Examiner* — Christopher C Harris
(74) *Attorney, Agent, or Firm* — The Maxham Firm; Lawrence A. Maxham

(57) ABSTRACT

A computer-implemented method of transferring a data string from an application to a data protection device. To provide a computer-implemented method of transferring a data string from an application to a data protection device that the database query contains the data string and the database query is coded in a database language.

22 Claims, 1 Drawing Sheet

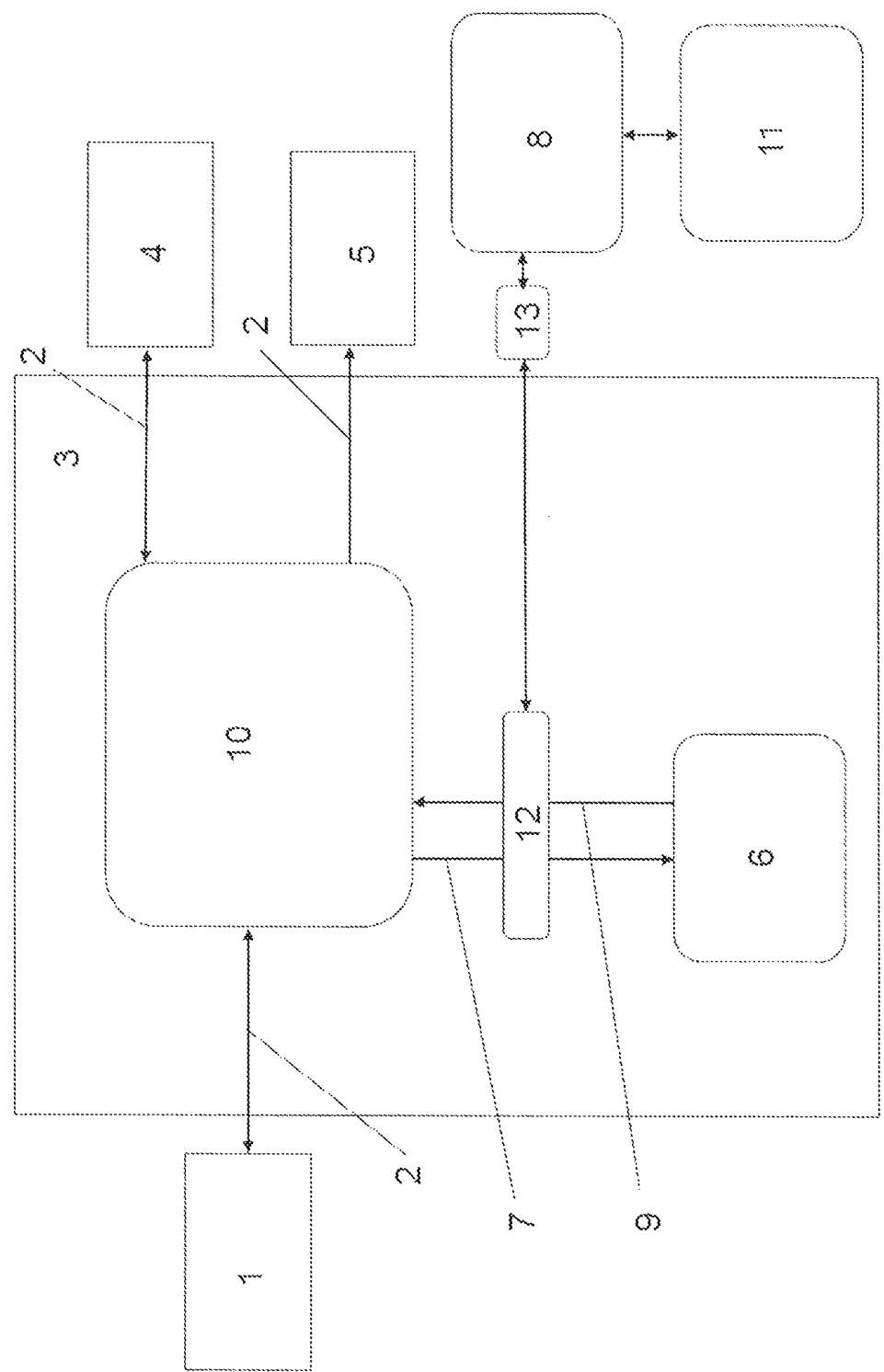

COMPUTER-IMPLEMENTED METHOD OF TRANSFERRING A DATA STRING FROM AN APPLICATION TO A DATA PROTECTION DEVICE

FIELD OF THE INVENTION

The present invention concerns a computer-implemented method of transferring a data string from an application to a data protection device.

BACKGROUND OF THE INVENTION

Data protection devices are known from the state of the art in many different configurations and variants. Such data protection devices serve to subject parts of data to be processed in an application to a data protection operation. An example of such a data protection operation is, for example, the replacement of a credit card number as a data string in a data set by a token as a placeholder which does not permit an attacker to arrive at any conclusion about the actual card number. Further examples of a data protection operation are the generation of a hash value or validation of a secret number (PIN) as is usual in relation to card payments.

A purpose for such devices is to guarantee the necessary security of the data protection operation that is typically carried out outside the actual application. Such a separation between the application for data processing and the data protection device for carrying out the data protection operation also makes it possible to implement highly complex data protection operations without burdening the application.

It will be noted, however, that the data string to which the data protection operation is to be applied has to be transferred from the application to the data protection device, in which case the data protection device must transfer a response string back to the application. For that purpose known data protection devices have programming interfaces which are proprietary for the respective data protection device and are frequently highly complex, for example, PKCS #11, which are available to the programmers of the respective application in order to implement transfer of the data string to the data protection device in the application. Frequently, however, a data protection device is to be provided for a large number of applications programmed in different languages. In that case it would be necessary for the producer of the data protection device to provide a specific programming interface for each programming language of a respective application. By virtue of the complexity, the cost, and effort on the part of the producer of the data protection device, however, that is not a market standard procedure. As a result, the user of the data protection device usually does not have any possible way of using the data protection device in a simple fashion from all applications. In addition, it is usually not simply possible for the user to change from a data protection device of one manufacturer to a data protection device of another manufacturer as the programming, interfaces are completely different. The PKCS #11 standard has also not contributed to true standardisation as it is highly complex, and usually also requires a special library for each operating system and therefore has been comparatively little adapted.

SUMMARY OF EMBODIMENTS OF THE INVENTION

Therefore, a purpose of the present concept, as disclosed herein, is to provide a computer-implemented method of transferring a data string from an application to a data protection device, which is simple to use and understand,
follows a pattern which is already established and known in the computer industry, and/or
allows a user to have recourse to existing standard implementations (not linked to a specific manufacturer) and thus makes it unnecessary on the part of the producer of the data protection device to provide a multiplicity of programming interfaces for different languages.

According to the concept, at least one of those purposes is attained by a computer-implemented method of transferring a data string from an application to a data protection device, wherein the method comprises the steps of: generating a database query in the application, wherein the database query contains the data string, and wherein the database query is coded in a database language; communicating the database query from the application to an emulator; converting the database query into a data protection instruction in the emulator, wherein the data protection instruction contains the data string, and wherein the data protection instruction is coded in a language other than the database language; communicating the data protection instruction from the emulator to the data protection device; applying a data protection operation to the data string and outputting a response string in the data protection device; communicating the response string from the data protection device to the emulator; and outputting the response string from the emulator to the application in the form of a result of the database query, that is coded in the database language.

The fundamental idea of the present invention is that, instead of providing a multiplicity of programming interfaces (more precisely interfaces for application programming or Application Programming Interface (API)) in a multiplicity of target languages, an exemplary method according to the invention has recourse to the programming interfaces for a database, that are also available in many programming languages, wherein conversion of the database query in the language of the respective database (database language) into a language other than the database language is effected in the emulator. Front the point of view of the application the callup of the data protection operation looks like nothing other than any other database query for the database defined by the database language. The other language into which the database query is converted is typically that language in which the data protection device is implemented.

In an embodiment the database query is generated in the application in a coding compatible with the programming language of the application. For that purpose, the database manufacturer makes programming interfaces available for a large number of programming languages which are used for programming applications.

In an embodiment of the invention such a programming interface converts the database query which is compatibly coded with the application from the application into a typical unitary coding which can be interpreted by a database backend. For example, the coding which can be interpreted by the database backend is a protocol specific for the database backend for communication of the database queries by way of a network. In a conventional database query the database query would now be communicated to the database backend in the coding which can be interpreted by the database backend, in particular by way of a network. According to an embodiment of the invention, the emulator occurs at the location of the database backend. In that case conversion in the emulator includes conversion of the database query in the coding which can be interpreted by the database backend into the data protection instruction in a language different from the language of the database query. It will be appreciated that that language which is different from the database language is a language which can be interpreted by the data protection device.

In such a configuration of the conversion operation conversion of the response string is also affected by the data protection device in two stages. In the emulator firstly the response string in the other language is converted into the coding which can be interpreted by the database backend and die programming interface. Finally, the response string is converted in the programming interface into the coding compatible with the application and output to the application.

The described embodiments make it clear that the advantage of emulation is that the data protection device only has to provide a single interface to the language of the database backend while, for linkage to the various languages for application programming, it is possible to have recourse to the programming interfaces of the database manufacturer or provider.

It will be appreciated that the information of the data string which is to be subjected to the data protection operation must be retained in the transfer, that is to say, in particular in conversion between the database language and the language of the data, protection device.

The term "data string" is used in accordance with the present application to denote any kind of character sequence. A data set is composed of one or more such data strings. In that respect, the data strings in a data set can be differentiated from each other or marked in some fashion, but they do not have to be. In particular a data set can comprise a single character sequence which includes a plurality of data strings. A configuration of a data set in accordance with the present invention is a message which includes the data string or the response string.

A data set in an embodiment can be a message describing a financial transaction, wherein the message contains, for example, information about location, subject, and price of the transaction.

An application in accordance with the present application is any device but in particular a program or a program portion which preferably processes a data set and in same carries out, for example, replacement of the data string by the placeholder or vice-versa.

In a further embodiment communication of the database query from the application to the emulator and/or from the emulator to the data protection device and/or vice-versa is effected by way of a network connection with a protocol for data security, which protects the integrity of the data and/or permits secure authentication at least on the part of the data protection device and/or protects same from unauthorised reading. Such a protocol which complies with those requirements is, for example, SSH.

The present invention is basically suitable for all types of database languages. In an embodiment, however, the database language is a no structured query language (NoSQL) language, preferably a language for a key-value database. Such key-value databases have the advantage of simple syntax of the associated database language and the comparatively simple conversion, for example, emulation in the emulator, and the performance and scalability resulting therefrom. In an embodiment of the invention the key-value database whose database language is used in the application for transfer of the data string is an in-memory database, for example, Redis. Key-value databases make it possible to store pairs of keys and values and to retrieve them again, wherein the values are provided from the cache of the computer in response to the database query.

It will be appreciated that such emulation of the database that is implemented in the emulator, is only visible in relation to the application, but instead the emulator provides for conversion of the database query coded in the database language into the language of the data protection device.

Key-value databases or the database language thereof are therefore highly suitable for the present invention as, particularly when the data string is replaced by a token or another placeholder by means of the data protection operation, the data structure of the key-value database matches the problem of replacement of the data string by a placeholder.

In an alternative embodiment the database language is structured query language (SQL), as is used in relational databases.

In an embodiment of the invention, in addition to transfer of the data string from the application to the data protection device by means of the database query, a configuration parameter coded in the database language for the data protection operation is transferred from the application to the data protection device. There are two alternative variants for that purpose according to the invention.

In the first variant the configuration parameter for the data protection operation is inserted into the database query which contains the data string for the data protection device, wherein the database query is then converted in the emulator in such a way that a data protection configuration command is formed with the configuration parameter, wherein the data protection configuration command is coded in the language other than the database language, in particular the language of the data protection device. Finally, the data protection configuration command generated in that way is communicated from the emulator to the data protection device and the data protection operation is applied to the data string, with a configuration predetermined by the configuration parameter.

In a second variant a database configuration command is generated in the application, which for the first instance is independent of the database query, wherein the database configuration command contains the configuration parameter for the data protection operation. In that case, as previously, the database configuration command is coded in the database language. That database configuration command is then communicated from the application to the emulator and there converted into a data protection configuration command with the configuration parameter. It will be appreciated that in this variant also the data protection configuration command is coded in the other language, that is to say, the same language as the data protection instruction.

In an embodiment of the invention the emulator is in the form of a proxy in a data network, wherein the application and the data protection device are further elements of the same network.

Performance of the computer-implemented method according to the present invention is meaningful, in particular, when the data protection device is implemented on specific hardware. Admittedly, programming interfaces can also be provided in a different target language for such special hardware, but they can only be handled with difficulty from the point of view of the application programmer. An example of such special hardware is a hardware security module (HSM). In an embodiment of the invention, therefore, the data protection device is implemented on a hardware security module, the data protection instruction being coded in a language of the hardware security module. A further example of such special hardware is a programmable logic circuit (field programmable gate array or FPGA), wherein then the data protection device is implemented on the FPGA and the data protection instruction is coded in a language of the FPGA.

The present invention is basically suitable for any data protection operation which is implemented in a data protection device and which acts on a data string and provides a functionality that is required for data protection.

In an embodiment of the invention the data protection device is a device for verifying a data protection element, wherein the data string is an encrypted or unencrypted representation of the data protection element, wherein the data protection operation is a data protection element verification and wherein the response string contains information about the validity of the data protection element. In that case the data protection element can be present as such unencrypted or, however, also encrypted, in an embodiment of the invention the data protection element is an encrypted block which contains a PIN and the data protection operation includes a PIN verification, wherein firstly the block with the PIN is to be decrypted prior to the actual verification step. In a further embodiment the data protection operation can be a password check, the data protection element then being a password. During, the data protection operation, the password is hashed, compared to a stored hash and the response string contains information about whether the password is valid or not.

In an alternative embodiment the data protection device is a signature device, wherein the data string is an element to be signed, wherein the data protection operation is a signature operation and wherein the response string contains the signed element.

In a further embodiment the data protection device is a device for verifying a signature, wherein the data string contains a signature, wherein the data protection operation is a signature verification and wherein the response string contains information about the validity of the signature.

In a further embodiment of the invention the data protection device is a hashing device, wherein the data string is an element for which a hash value is to be generated, wherein the data protection operation is a hash value generated from the data string and wherein the response string contains the hash value.

In a further alternative embodiment the data protection device is a replacement device for replacing a data string by a placeholder, wherein the data protection operation is a replacement instruction, wherein a placeholder replacing the data string is generated in the replacement device and wherein the response string is the placeholder.

The term "replacement device" in accordance with the present application is used to denote a device, but in particular a program or a program portion, which performs generation of the placeholder from the data string and restoration of the data string.

In an embodiment of the invention replacement of the data string by the placeholder is affected irreversibly. Restoration of the original data string from the placeholder is not possible in such an embodiment but is also not required at all for some application scenarios.

In an alternative embodiment, in contrast, the method of replacing the data string is reversible and for restoration of the data string from the place holder in the replacement device the method comprises the steps, of: generating a database query in the application, wherein the database query contains the placeholder and wherein the database query is coded in the database language; communicating the database query from the application to the emulator; converting the database query into a restoration instruction in the emulator, wherein the restoration instruction contains the placeholder and wherein the restoration instruction is coded in the other language; communicating the restoration instruction to the replacement device; restoring the data string from the placeholder in the replacement device; communicating the data string from the replacement device to the emulator; and outputting the data string from the emulator to the application in the form of a result of the database query.

In a further embodiment of the invention the data string to be replaced is at least a part of to an account number or a card number. In that case replacement of a card or account number as a data string by a pseudonymised placeholder serves here only for carrying out an example. In principle, however, replacement methods are suitable for all applications in which certain data, in particular personal data, or person-related data, have to be anonymised.

In a further embodiment of the invention the application is carried out on a server for cashless payment transaction system.

In an embodiment of the invention for generating the placeholder which is associated with the data string to be replaced and which replaces same from the data string, a placeholder is generated which is an encrypted representation of the original data string.

Generation, according to the invention, of a placeholder which is associated with the data string and replaces same is based in an alternative embodiment on tokenization of the data string, the data string being replaced by a token as the placeholder.

Indispensable requirements in terms of reversible tokenization are in that respect the reversibility of the method, that is to say, every token must be capable of being unequivocally depicted again on the original data string, and format preservation of tokenization in order to be able to further process and, in particular, store the data set in which a data string was replaced by a token.

In an embodiment of the invention a plurality of tokens is randomly generated in the first instance as placeholders and an association between each replaced data string and the respective replacing token is filed in a table.

As the table with the association between the replaced data strings and the replacing tokens is stored securely by the nodes there is no possibility for a third party of getting back to the associated data strings from the data sets involved in processing, which are pseudonymised by means of the tokens.

Alternatively, tokenization replacement can also be effected by a bijective mathematical function which is applied to the replacing data string to be encrypted and which provides a unique depiction of the unencrypted data string on the token and of the token on the original data string.

European patent EP 2 735 991 B1 also discloses a further tokenization method of generating placeholders. In that method the token replacing the original data string is generated on the one hand by random characters stored in a look-up table or replacement table, but on the other hand by a function which is applied to the data string to be replaced itself and, as a result, then refers to the replacement table.

In that case a mathematical function applied to the original data string serves for the calculation of an index which determines that entry in the replacement table which is to be used next for replacement of a part of the unencrypted data string.

In this embodiment generation of the token from the unencrypted data string is in part effected by an index to the replacement table being mathematically generated from the unencrypted data string itself, but the individual characters of the unencrypted data string are replaced by random replacement values which are derived from the replacement table.

That generation of the token is based on an unbalanced Feistel network in which the data string for generating the token is firstly broken down into two partial strings. In that case the first partial string consists of a single character of the unencrypted string and the second partial string comprises the remaining characters of the unencrypted data string. In that respect the term "character" is interpreted broadly by the person skilled in the art. In particular the single character of the first partial string may include a plurality of elements of the underlying character set or alphabet, wherein that plurality of elements is processed for the replacement operation like a single character.

A preferred embodiment of the invention is even one in which the number of elements of the unencrypted data string which form the single character of the first data string is greater than one.

That tokenization method makes it unnecessary in particular to write the replaced unencrypted data strings, into the replacement table as restoration can be affected exclusively by means of the token, calculation of the index, of the replacement table and the corresponding entry of the replacement table. In that way the replacement table can be completely generated in the first instance and distributed, for example, to back-up systems. Synchronisation between identical replacement tables held in different systems at a later time is not required. Conflicts are inherently avoided.

Restoration of an unencrypted original data string from the token however presupposes that the token can be associated in same manner with a data string.

In an embodiment in the generation of the token the replacement character is calculated from the entry in the replacement table, that is determined by the index, and the character to be replaced, and in restoration of the unencrypted data string the replacement character is calculated from the entry determined by the index and the character to be replaced.

In such a configuration of the method it is desirable if the computation operations for calculating the replacement character upon generation of the token and upon restoration of unencrypted data strings are mutually inverse mathematical operations, in particular, addition and subtraction or multiplication and division.

In an embodiment of the invention the size of the alphabet used for the data string to be replaced is equal to the size of the alphabet constituting the replacement characters.

In order to ensure adequate security it is advantageous if the number of repetitions of the method steps upon generation of the token and restoration of the unencrypted data string is at least n+1 but preferably 2n, wherein n is the length of the data string to be replaced divided by the number of data string elements replaced per replacement operation.

In an embodiment of the invention calculation of the index of the replacement table upon generation of the token or upon restoration of the unencrypted data string from the token includes the following steps: calculating a hash value by application of a hash function to a binary input which includes the first partial string of the data string and determining the x most significant bits of the hash value as the index of the replacement value to be used, wherein x is the number of bits required to provide all entries of the replacement table with a unique index. In the event of truncating to x bits the replacement table can have $2^x$ entries which are all provided with a unique index which can be represented by the x bits.

In an embodiment of the invention the binary input to which the hash value is applied additionally includes a binary string (salt) of the length s and/or the arrangement of the repetition. In that respect the expression order of the repetition is used to denote the number of repetitions of the method steps for replacement of the individual characters of the data string including the current repetition round.

In an embodiment of the invention the binary string (salt) includes a partial string, which is not to be encrypted, of the data string, to be encrypted, and/or a randomly selected string. In particular the binary string (salt) can be composed of a combination of strings in order to enhance the system security.

By means of such a binary string, which is here referred to as a salt which can be used for calculation of the index for the replacement values to be used, the security of the method employed can be enhanced. If a randomly selected string is used as the binary string then the value thereof can either be randomly established by the administrator of the tokenization device or, for example, it can also be an established component part of the code for the tokenization device. In an embodiment of the invention the binary string for calculation of the index is a partial string, which is not to be encrypted, of an unencrypted data string, for example, a PAN.

In an embodiment moreover the application also includes an intercept device on a data channel, which for a data set transmitted in a first direction carries out the steps:
  a. Intercepting the data set transmitted by way of the data channel in the first direction;
  b. Identifying the data string to be replaced in the intercepted data set;
  c. Forwarding the data string to be replaced to at least one of the nodes of the replacement device for determining a placeholder for replacing the data string;
  d. Receiving the placeholder for replacing the data string from the at least one node;
  e. Exchanging the data string in the data set by the placeholder;
  f. Forwarding the data set with the placeholder in the first direction by way of the data channel;
  g. Wherein the intercept device for a data set transmitted in a second direction performs the steps of intercepting the data set transmitted by way of the data channel in the second direction;
  h. identifying a placeholder in the intercepted data set;
  i. Forwarding the placeholder to at least one of the nodes of the replacement device for restoration of the data string replaced by the placeholders;
  j. Receiving the data string replaced by the placeholders from the at least one node of the replacement device;
  k. Exchanging the placeholder in the data set by the data string; and
  l. Forwarding the data set with the data string by way of the data channel.

The idea of such an intercept device is to monitor the input/output channel of a further application for processing of the data set, that is to say, an application, and without intervention in the other devices of the system in all data sets which contain unencrypted security-relevant data strings, replacing same by place holders. The data sets which are thus modified by the intercept device and from which the data string can no longer be deduced are then processed by a further application, wherein said replacement of the unencrypted data string by the placeholder does not lead to an alteration upon processing as the placeholder preferably format-preservingly replaces the data string.

Insofar as the above-described embodiments of the method according to the invention can be at least partially carried into effect, wherein software-controlled data processing equipment is used, it is evident that a computer program which provides such software control and a memory medium on which such a computer program is stored are to be considered as aspects of the invention.

BRIEF DESCRIPTION OF THE DRAWING

Further advantages, features and possible uses of the present invention will be apparent from the following, detailed description of an embodiment, when read in conjunction with the accompanying drawing, in which:

FIG. 1 shows a block circuit diagram of an implementation of an embodiment of the method according to the invention.

DETAILED DESCRIPTION OF EMBODIMENTS OF THE INVENTION

A diagrammatic view of a payment transaction processing system in which the method according to the invention of transferring a data string from application 3 to data protection device 8 is depicted.

The illustrated payment transactions processing system comprises a plurality of checkout systems 1, of which one is shown in FIG. 1. The checkout system is connected to application 3 on a central server by way of network connection 2. Application 3 is in turn connected by way of network connections 2 both to credit card providers 4 and also to the actual payment settlement system 5.

In the illustrated embodiment the application in turn has a central processing unit 10, an intercept device 12, and a transaction data memory 6.

From checkout systems 1, server 3 receives information about the transaction to be carried out by way of network connection 2. That information includes in particular the (credit) card number of the purchaser and information relating to the price, the processing time of the purchase, and the like. In that respect the information about a transaction is in the form of a message transmitted from and to application 3 by way of network connections 2. Such a message is a data set in accordance with the present application. The information about the transaction conducted can be forwarded on the one hand from central processing, unit 10 of the application 3 directly, that is to say, without intermediate storage, to credit card provider 4 or payment settlement system 5. In that respect the forwarding operation is effected in clear text, that is to say, unencrypted, from the view of the system implementing application 3. That however only means that the application itself does not effect any encrypting for that communication. Rather, the channels 2 from and to application 3 are protected by systems which are proprietary for same. For example, networks 2 are in the form of VPN channels.

The task of the central processing unit 10 implemented in application 3 is processing the transaction information by virtue of its high availability and possibly storing same until the corresponding devices of credit card provider 4 and system 5 are also available again. In addition, storage of the transaction information is usually effected for later processing of complaints and for cumulated forwarding to payment settlement systems 5.

In order to ensure the greatest possible security in respect of the transaction data in handling in application 3, all PANs which are contained in the transaction data and which here form the unencrypted data string in accordance with the present application are replaced by tokens prior to storage of the data in transaction data memory 6. For that replacement input path 7 into transaction data memory 6 and, equally, output data path 9 from the transaction data memory are monitored by intercept device 12 as part of the application.

All data sets to be stored on input data path 7 which contain a PAN, that is to say, a security-relevant unencrypted data string, are intercepted by intercept device 12. The data set is analyzed and the unencrypted data string contained therein is transferred to tokenization device 8 (also referred to as the tokenization engine).

The tokenization device forms a data protection device in accordance with the present application. In order to ensure the greatest possible security for the data protection operation on tokenization device 8, the tokenization device is implemented outside the application so that data exchange is effected between application 3 and the tokenization device by way of network connection 2. In addition, tokenization device 8 is not implemented on a conventional server but on specific hardware, more specifically, in a hardware security module, which ensures the greatest possible security from software and hardware attacks.

Provided for tokenization device 8 on the hardware security module is a programming interface (API) which, in a simple fashion, makes it possible or PANs to be transmitted from application 3 to tokenization device 8 and tokens from the tokenization device to the application. It will be appreciated that that programming interface is specific for the language in which application 3 is implemented. It follows therefrom that typically the manufacturer of the tokenization device must make a programming interface available for every programming language in which applications are implemented, into which tokenizing is to be integrated.

The variant shown in FIG. 1, however, has recourse for the respective programming interface for application 3 to the programming interface available in many languages of the key-value database Redis. Transfer of a PAN intercepted by intercept device 12 is then affected with a database query programmed in the database language for Redis. It is apparent that tokenization device 8 does not readily understand such a database query, that is to say, able to extract the PAN and carry out the data protection operation. Therefore, emulator 13, implemented in the form of a proxy is provided in data network 2 between the application and the tokenization device. This extracts the PAN from the database programmed in the database language for Redis and includes the PAN in a data protection instruction which is coded in the language of tokenization device 8 and which is then transferred from emulator 13 to the tokenization device.

Tokenization device 8 then applies tokenization as a data protection operation corresponding to the data protection instruction to the data string. The tokenization device receives the unencrypted data string and replaces it by a token. The token is then transferred again in the language of the tokenization device to the emulator and there converted into a result of a database query, that is coded in the database language for Redis, and transferred as such to intercept device 12 of the application. Thereafter, intercept device 12 replaces the unencrypted data string, by a token in the intercepted data set and outputs the secure data set altered in that way to transaction data memory 6 for storage of the data set.

If conversely a data set is to be read out of the transaction data memory and provided for the central processing, unit then firstly the token of the data set stored in the transaction data memory has to be replaced again by the unencrypted data string.

For that purpose, all data sets read out of the transaction data memory are intercepted by intercept device 12 on output data path 9. The data set is analyzed, and the token contained therein is transferred as described hereinbefore for the PAN to tokenization device 8 by way of emulator 13. The token is received by the tokenization device and replaced again by the associated unencrypted data string. The unencrypted data, string is then again transferred to intercept device 12 by way of emulator 13. The intercept device then replaces the token in the data set that is read from transaction data memory 6 and intercepted by the unencrypted data string, and outputs the data set changed in that way to central processing unit 10 of application 3 for further processing of the data set. Such further processing includes, in particular, routing a message with the data set to card provider 4 or payment settlement system 5.

It has been found to be advantageous with that architecture that the PANs relating to the individual transactions are not in clear text in transaction data memory 6 but are replaced by tokens, that is to say, randomly ascertained synonyms. An attack on transaction data memory 6 therefore never supplies the information about the PANs so that such an attack remains ineffective. To ensure the greatest possible security the actual tokenization device and the combination according to the invention of index function and replacement table which are stored in the so-called token vault 11 are implemented separately from each other.

For the purposes of the original disclosure it is pointed out that all features as can be seen by a person skilled in the art from the present description, the drawings, and the claims, even if they are described in specific terms only in connection with certain other features, can be combined both individually and also in any combinations with others of the features or groups of features disclosed here insofar as that has not been expressly excluded or technical aspects make such combinations impossible or meaningless. A comprehensive explicit representation of all conceivable combinations of features and emphasis of the independence of the individual features from each other is dispensed with here only for the sake of brevity and readability of the description.

While the invention has been illustrated and described in detail in the drawing and the preceding description, that illustration and description are only by way of example and are not deemed to be a limitation on the scope of protection as defined by the claims. The invention is not limited to the disclosed embodiments.

Modifications in the disclosed embodiments are apparent to the person skilled in the art from the drawing, the description, and the accompanying claims. In the claims the word "have" does not exclude other elements or steps and the indefinite article "a" does not exclude a plurality. The mere fact that certain features are claimed in different claims does not exclude the combination thereof. References in the claims are not deemed to be a limitation on the scope of protection.

LIST OF REFERENCE NUMERALS

1 checkout system
2 network connection
3 application
4 credit card provider
5 payment settlement systems
6 transaction data memory
7 input path
8 tokenization device
9 data output path
10 central processing unit of the server
11 token vault
12 intercept device
13 emulator

What is claimed is:

1. A computer-implemented method of transferring a data string from an application to a data protection device, comprising the steps of:
   generating a database query in the application,
      wherein the database query contains the data string, and
      wherein the database query is coded in a database language;
   communicating the database query from the application to an emulator;
   converting the database query into a data protection instruction in the emulator,
      wherein the data protection instruction contains the data string, and
      wherein the data protection instruction is coded in a language other than the database language;
   communicating the data protection instruction from the emulator to the data protection device;
   applying a data protection operation to the data string and outputting a response string in the data protection device;
   communicating the response string from the data protection device to the emulator; and
   outputting the response string from the emulator to the application in the form of a result of the database query that is coded in the database language.

2. The computer-implemented method according to claim 1, wherein the database language is a no structured query language (NoSQL).

3. The computer-implemented method according to claim 1, wherein the database language is a structured query language (SQL).

4. The computer-implemented method according to claim 1, wherein the method additionally comprises the steps of:
   generating a database configuration command in the application,
      wherein the database configuration command contains a configuration parameter for the data protection operation; and
      wherein the database configuration command is coded in the database language;
   communicating the database configuration command from the application to the emulator;
   converting the database configuration command into a data protection configuration command with the configuration parameter in the emulator;
      wherein the data protection configuration command is coded in the language other than the database language; and
   inserting a configuration parameter for the data protection operation into the database query;
   converting the database query in the emulator so that a data protection configuration command is formed with the configuration parameter:

wherein the data protection configuration command is coded in the language other than the database language; and communicating the data protection configuration command from the emulator to the data protection device; and applying the data protection operation to the data string with a configuration which is predetermined by the configuration parameter.

5. The computer-implemented method according to claim 4, wherein the data protection device is implemented on a hardware security module, wherein the data protection instruction is coded in a language of the hardware security module, or that the data protection device is implemented on a programmable logic circuit, wherein the data protection instruction is coded in a language of the programmable logic circuit.

6. The computer-implemented method according to claim 1, wherein the method additionally comprises the steps of:
generating a database configuration command in the application,
wherein the database configuration command contains a configuration parameter for the data protection operation; and
wherein the database configuration command is coded in the database language;
communicating the database configuration command from the application to the emulator;
converting the database configuration command into a data protection configuration command with the configuration parameter in the emulator;
wherein the data protection configuration command is coded in the language other than the database language; or
inserting a configuration parameter for the data protection operation into the database query;
converting the database query in the emulator so that a data protection configuration command is formed with the configuration parameter;
wherein the data protection configuration command is coded in the language other than the database language; and
communicating the data protection configuration command from the emulator to the data protection device; and
applying the data protection operation to the data string with a configuration which is predetermined by the configuration parameter.

7. The computer-implemented method according to claim 1, wherein the emulator is in the form of a proxy.

8. The computer-implemented method according to claim 1, wherein the data protection device is implemented on a hardware security module, wherein the data protection instruction is coded in a language of the hardware security module, or that the data protection device is implemented on a programmable logic circuit, wherein the data protection instruction is coded in a language of the programmable logic circuit.

9. The computer-implemented method according to claim 1, wherein:
the data protection device is a device for verifying a data protection element,
wherein the data string is an encrypted or unencrypted representation of the data protection element,
wherein the data protection operation is a data protection element verification, and
wherein the response string contains information about the validity of the data protection element; and
the data protection device is a signature device,
wherein the data string is an element to be signed,
wherein the data protection operation is a signature operation, and
wherein the response string contains the signed element.

10. The computer-implemented method according to claim 1, wherein:
the data protection device is a device for verifying a data protection element,
wherein the data string is an encrypted or unencrypted representation of the data protection element,
wherein the data protection operation is a data protection element verification, and
wherein the response string contains information about the validity of the data protection element; and
the data protection device is a device for verifying a signature,
wherein the data string contains a signature,
wherein the data protection operation is a signature verification, and
wherein the response string contains information about the validity of the signature.

11. The computer-implemented method according to claim 1, wherein:
the data protection device is a device for verifying a data protection element,
wherein the data string is an encrypted or unencrypted representation of the data protection element,
wherein the data protection operation is a data protection element verification, and
wherein the response string contains information about the validity of the data protection element; and
the data protection device is a hashing device,
wherein the data string is an element for which a hash value is to be generated,
wherein the data protection operation generates a hash value from the data string, and
wherein the response string contains the hash value.

12. The computer-implemented method according to claim 1 wherein:
the data protection device is a replacement device for replacing a data string by a placeholder;
the data protection operation is a replacement instruction, wherein a placeholder replacing the data string is generated in the replacement device; and
the response string is the placeholder.

13. The computer-implemented method according to claim 12, wherein for restoring the data string from the placeholder it further comprises the steps of:
generating a database query in the application,
wherein the database query contains the placeholder, and
wherein the database query is coded in the database language;
communicating the database query from the application to the emulator;
converting the database query into a restoration instruction in the emulator,
wherein the restoration instruction contains the placeholder, and
wherein the restoration instruction is coded in the other language;
communicating the restoration instruction to the replacement device;

restoring the data string from the placeholder in the replacement device;

communicating the data string from the replacement device to the emulator; and outputting the data string from the emulator to the application in the form of a result of the database query.

14. The computer-implemented method according to claim 13, wherein the placeholder is an encrypted representation of the original data string.

15. The computer-implemented method according to claim 13, wherein generation of the placeholder is based on tokenization of the data string, wherein the data string is replaced by a token as the placeholder.

16. The computer-implemented method according to claim 12, wherein the placeholder is an encrypted representation of the original data string.

17. The computer-implemented method according to claim 12 wherein generation of the placeholder is based on tokenization of the data string, wherein the data string is replaced by a token as the placeholder.

18. The computer-implemented method according to claim 17, wherein a plurality of tokens is randomly generated in advance as placeholders and an association between the replaced data string and the replacing token is filed in a table.

19. A data processing apparatus on which a computer program according to claim 18 is loaded.

20. The computer-implemented method according to claim 17, wherein tokenization is effected by a bijective mathematical function which is applied to the data string to be replaced and which provides a one-to-one correspondence of the data string on the token and of the token on the unencrypted data string.

21. The computer-implemented method according to claim 17, wherein a token is generated as the placeholder, wherein generation of the token replacing the data string comprises the steps of:

preparing a replacement table with random entries, wherein an index of the replacement table is associated with each entry;

dividing an unencrypted data string into two partial strings, wherein the first partial string comprises a character of the unencrypted data string and the second partial string comprises the remaining characters of the unencrypted data string;

calculating an index of the replacement table from the second partial string so that an entry of the replacement table is determined;

generating a replacement character from the entry determined by the index;

replacing the character of the first partial string by the replacement character;

interchanging the first and second partial strings so that the replaced character of the first partial string becomes the last character or the first character of the second partial string and the first character or the last character of the second partial string becomes the character of the first partial string; and repeating the foregoing steps so that a token associated with the unencrypted data string is generated; and generation of the data string to be restored from the token comprises the steps of:

preparing the replacement table;

dividing the tokens into two partial strings, wherein the first partial string comprises all characters except the last character of the token and the second partial string only consists of the last character of the token;

calculating an index of the replacement table from the first partial string so that a given entry of the replacement table is determined;

generating the replacement character from the entry of the replacement table that is determined by the index, so that the character of the second partial string is replaced by the replacement character;

interchanging the first and second partial strings so that the character of the second partial string becomes the first character or the last character of the first partial string and the last character or the first character of the first partial string becomes the character of the second partial string; and repeating the foregoing steps so that the unencrypted data string associated with the token is restored.

22. A computer program with program code stored on a memory medium and executed on a data protection device for carrying out the method according to claim 1.

* * * * *

UNITED STATES PATENT AND TRADEMARK OFFICE
CERTIFICATE OF CORRECTION

| | |
|---|---|
| PATENT NO. | : 11,568,076 B2 |
| APPLICATION NO. | : 16/422847 |
| DATED | : January 31, 2023 |
| INVENTOR(S) | : Henning Horst and Michael Horst |

It is certified that error appears in the above-identified patent and that said Letters Patent is hereby corrected as shown below:

On the Title Page

Include Item (30) the Foreign Application Priority Data:
May 28, 2018 (DE)..............................................10 2018 112 742

Signed and Sealed this
Thirteenth Day of February, 2024

Katherine Kelly Vidal
*Director of the United States Patent and Trademark Office*